United States Patent

Szczepanski

[15] 3,648,439

[45] Mar. 14, 1972

[54] BUOYANT FILTER MASS

[72] Inventor: Harry Szczepanski, 900 Clancy Avenue, N.E., Grand Rapids, Mich. 49503

[22] Filed: Apr. 1, 1969

[21] Appl. No.: 811,812

[52] U.S. Cl. .................................55/223, 55/233, 55/257, 98/115 SB, 261/94, 261/119
[51] Int. Cl. .......................................................B01d 47/00
[58] Field of Search.......................55/233, 234, 257, 260, 90, 55/91, 223; 98/115, 5 B; 261/95, 114, 94, 119

[56] References Cited

UNITED STATES PATENTS

| | | | |
|---|---|---|---|
| 2,094,844 | 10/1937 | Kiesskalt et al. | 261/95 |
| 2,132,826 | 10/1938 | Ludwig | 98/115 |
| 2,259,626 | 10/1941 | Erikson | 98/115 |
| 3,122,594 | 2/1964 | Kielback | 55/233 |
| 3,370,404 | 2/1968 | Leeper | 98/115 |
| 3,409,279 | 11/1968 | Metrailer | 55/91 |
| 3,494,108 | 2/1970 | Moragne | 55/233 |

FOREIGN PATENTS OR APPLICATIONS

| | | | |
|---|---|---|---|
| 109,855 | 4/1900 | Germany | 55/234 |

Primary Examiner—Frank W. Lutter
Assistant Examiner—Bernard Nozick
Attorney—Glenn B. Morse

[57] ABSTRACT

A group of elements is placed, and preferably supported by buoyancy in a liquid. The elements and portions of elements disposed above the surface of the liquid function as a filter mass for a stream of gaseous material forced to traverse the mass by a cowling. The liquid may be selected to be a solvent to some of the condensable and entrained materials carried in the stream. Filtered deposits on the elements are removed either by the effect of gravity tending to rotate the heaviest portions of the elements down into the liquid, or by recirculating the elements in the liquid.

8 Claims, 2 Drawing Figures

INVENTOR.
HARRY SZCZEPANSKI

BUOYANT FILTER MASS

BACKGROUND OF THE INVENTION

The use of various forms of particulate material to function as a filter mass is common practice. Removal of the condensed and entrapped material from the particles constituting a filter mass is occasionally referred to as "regeneration", and is usually done as a purging operation separate from the normal functioning of the equipment. Periodic regeneration under automatic controls is also a common practice, and a form of continuous regeneration is provided by the use of belt-type filtration mats. This general field of development is usually associated with air-conditioning equipment, and with the removal of vapors and entrained droplets of paint from the atmosphere in spray booths. The problem that has not effectively been solved by any of the prior art equipment is the provision of a self-purging filter mass with a system sufficiently simple to avoid cost and maintenance problems.

SUMMARY OF THE INVENTION

A mass of preferably hollow balls is placed in a laterally confined area in a liquid of greater specific gravity than the balls. The liquid may be a solvent to at least some of the materials to be filtered out of a gaseous stream forced to traverse the filter mass of balls by suitable cowling. The cross section of the mass, the length of it in the direction of movement of the gaseous stream, and the size of the balls, are selected with reference to the resistance to gas flow that can be tolerated. A cowling panel above the surface of the liquid confines the gas flow so that the buoyant balls occupy the full height of the passage traversed by the stream. Materials condensing and impinging on the balls are removed by the liquid, preferably facilitated by recirculating the balls in the liquid through the effect of the moving gaseous material itself. Materials not removable by the liquid may be cleaned off by periodic processing in separate equipment, or while the machine is momentarily converted to a purging phase. The wetting action of the liquid on the balls facilitates the condensing and entrapment of entrained materials, whether the liquid can dissolve such materials or not. Non-soluble materials carried on a wetted surface tend to be dislodged by the later passage through the liquid.

DESCRIPTION OF THE PREFERRED EMBODIMENT

Figure 1:
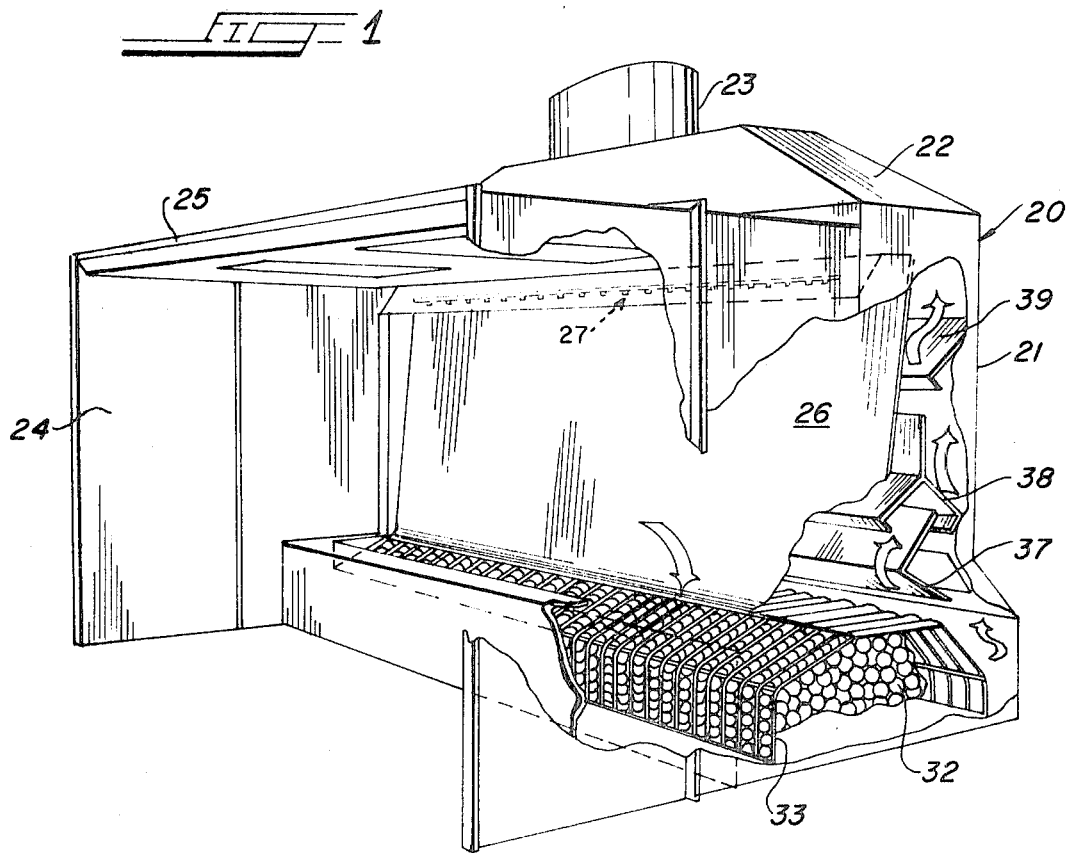
FIG. 1 is a perspective view, partially in section, showing the invention as applied to a spray booth structure.
Figure 2:
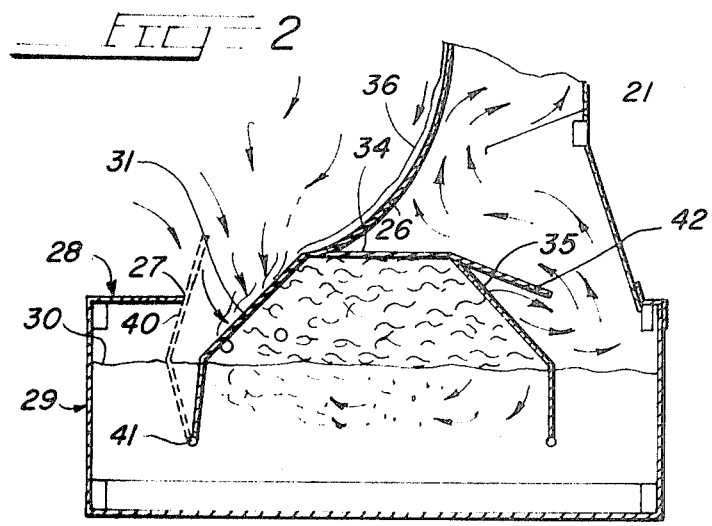
FIG. 2 is a section in vertical elevation on an enlarged scale showing the filtering portion of the equipment illustrated in FIG. 1.

FIG. 1 illustrates an arrangement incorporating the invention into an otherwise standard spray booth structure generally indicated at 20. The housing 21 is primarily a duct leading to the plenum 22 connected to the suction pipe 23. The flow of contaminated air induced by this suction will follow the pattern of the arrows in FIGS. 1 and 2, and will continually purge the work space bounded by the side panels 24 and the top panel 25. The wall 26 of the housing 21 forms the structural element of a so-called water curtain. A sheet of water is generated over the entire surface of the panel 26 by a group of jets 27 arranged near the upper extremity of the panel 26, and directed downward. This arrangement is conventional. Paint spray directed generally at the panel 26 will impinge on the water curtain, and the droplets of spray going past a workpiece mounted somewhere within the work area will be carried by the flowing sheet of water, rather than impinging directly on the structure of the spray booth.

The contaminated air pulled out of the work area by the effect of the suction flow will enter the space between the bottom of the panel 26 and the edge 27 of the shelf 28. A tank 29 is partially filled with water, preferably to the level indicated at 30. An open grille 31 is formed by parallel rods spaced apart by a distance somewhat less than the diameter of the individual ball-shaped filter elements 32. With this relationship, the parallel rods 33 form guideways for the upper portion of the natural circulation movement which causes the filter elements to move in a continuous circuit between the filtering position above the surface 30 of the water and a purging position underneath the surface. This movement produces a clockwise motion, as viewed in FIG. 2. The balls 32 are of less specific gravity than the water or other liquid in the tank 29, and the number of the balls is selected with reference to the height of the space between the surface 30 and the top cowling panel 34. This space forms a passage for the flow of gaseous and entrained material removed from the work area by the suction ducting, and this flow passes through the filter mass provided by the balls 32 (and portions of them) which are present between the surface 30 and the panel 34.

The rods 33 have an inclined portion at the downstream end of this passage, which has the effect of gradually depressing the balls of the filter mass as they move in the direction of the stream of air in the filter passage. This downward motion, generated primarily by the effect of the moving air, will induce a rotation of the entire mass as indicated by the arrows in FIG. 2. The inclined portions 35 of the guide rods tend to prevent a packing action which would interfere with the circulation of the balls. The movement of the balls back through the water in a motion opposite to that of the draft of air in the passage above the surface will not only have the effect of wetting the balls, but will tend to remove particles and substances that may have impinged on the wetted surface of the balls during their movement through the filtration passage. As the balls emerge at the upstream end of the filtration passage (toward the left side of FIG. 2) they will be wetted not only by the effect of their recent submersion in the liquid, also by the water 36 moving down over the panel 26. Material removed from the balls by their passage through the tank will normally settle to the bottom of the tank, and may be removed by standard procedures. Any residual entrained particles remaining in the suction draft after passing through the filter mass will tend to become impinged on the baffles 37-39 shown in FIG. 1, which are standard equipment in spray booth structures. The provision of a slant to the guide rods at the upstream end of the filtration passage utilizes the buoyance of the balls to encourage the clockwise rotation pattern of the mass.

Since the connecting pipe 23 will normally be associated with a system supplying a number of different machines, it often becomes desirable to have a separate control of the amount of the suction draft passing through an individual machine. This can be accomplished through the use of a movable gate 40 mounted on a shaft 41 supported by the opposite ends of the tank 29. The gate 40 may be swung from the full line to the dotted line positions shown in FIG. 2 to control the opening at which the draft is admitted. The panel 42 at the downstream end of the filtration passage may either function as a fixed baffle, or may be controllable to restrict the exit opening as an additional or separate means of controlling the flow of gaseous material in the filtration passage.

The functioning of the invention is primarily dependent upon a natural circulation induced by the movement of the air through the filter balls above the surface of the water.

I claim:

1. A filter system, comprising: a tank containing a liquid; a group of filter elements of less specific gravity than said liquid, said elements being disposed in said tank and supported by said liquid; cowling means fixedly positioned with respect to said tank in spaced relationship with the surface of said liquid to retain said elements and define together with said surface a passage substantially fully occupied by at least portions of said elements whereby the elements are cleaned by movement in the liquid; said passage having inlet and outlet means; and duct means fixedly positioned with respect to said tank for conducting gaseous material to said inlet and from said outlet of said passage.

2. A system as defined in claim 1, wherein said liquid is a solvent to particular condensible and/or suspended materials entrained in said gaseous material.

3. A system as defined in claim 1, wherein said elements are spherical.

4. A system as defined in claim 1, in combination with a spray booth structure having liquid discharge means for producing a liquid curtain discharging at a position adjacent the upstream end of said passage to wet said elements.

5. A system as defined in claim 1, wherein said group has a sufficient number of elements to support certain of said elements completely above the level of said liquid, and said cowling means is disposed to accommodate to said certain elements.

6. A system as defined in claim 5, additionally including guide means fixedly positioned with respect to said cowling and confining said group of elements to a predetermined space within and above said liquid, said guide means being open to flow of said gaseous material.

7. A system as defined in claim 6, wherein said guide means includes a downwardly inclined portion adjacent the downstream end of said passage disposed to gradually urge said elements downward into said liquid, proceeding in the direction of movement of said gaseous material in said passage.

8. A system as defined in claim 6, wherein said guide means additionally includes an upwardly inclined portion adjacent the upstream end of said passage, proceeding in the direction of movement of said gaseous material in said passage.

* * * * *